United States Patent [19]
Tajima et al.

[11] 3,861,740
[45] Jan. 21, 1975

[54] SADDLE POSITION ADJUSTING DEVICE FOR A VEHICLE SUCH AS BICYCLE

[75] Inventors: Yasutomo Tajima; Tsutomu Yasuda; Genichi Seki, all of Gyoda City, Japan

[73] Assignee: Showa Manufacturing Co., Ltd., Tokyo, Japan

[22] Filed: Aug. 20, 1973

[21] Appl. No.: 389,988

[30] Foreign Application Priority Data
June 18, 1973 Japan............................ 48-67747

[52] U.S. Cl................. 297/195, 248/157, 280/278, 297/338, 297/345
[51] Int. Cl............................................. B62j 1/00
[58] Field of Search ........... 297/195, 339, 347, 345, 297/364, 338; 248/404, 400, 157; 280/226 R, 283, 287, 289, 278; 108/147

[56] References Cited
UNITED STATES PATENTS

| 598,186 | 2/1898 | Thompson | 280/283 |
| 598,234 | 2/1898 | Thompson | 280/283 |
| 3,201,079 | 8/1965 | Doetsch | 248/400 X |
| 3,285,207 | 11/1966 | Vom Hagen | 248/404 X |
| 3,339,873 | 9/1967 | Hale | 297/349 X |
| 3,606,383 | 9/1971 | Mesinger | 280/283 |

*Primary Examiner*—James T. McCall
*Attorney, Agent, or Firm*—A. W. Breiner

[57] ABSTRACT

A saddle position adjusting device for a vehicle such as a bicycle comprising means for releasably locking an oil cylinder. The device can be operated when the body-weight of the rider is applied or not applied on the saddle to adjust the height of the saddle.

10 Claims, 9 Drawing Figures

PATENTED JAN21 1975 3,861,740

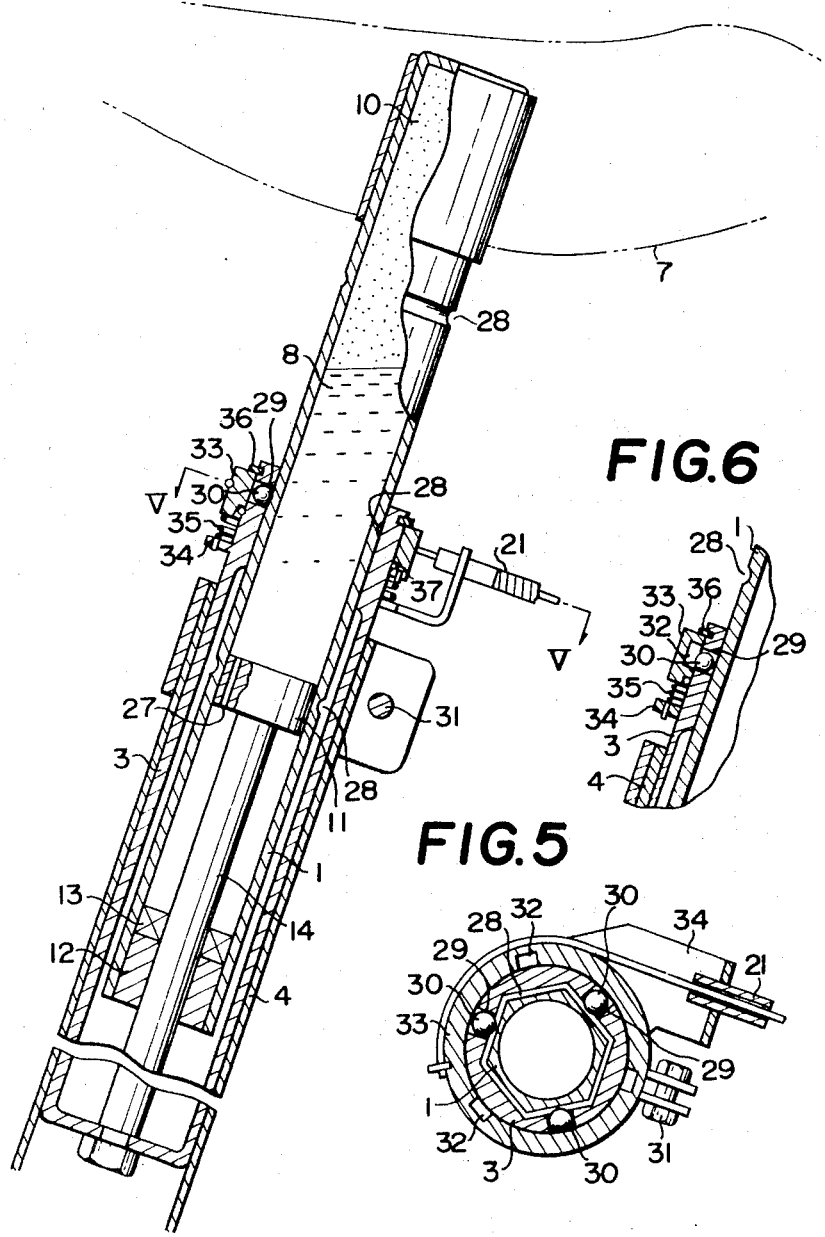

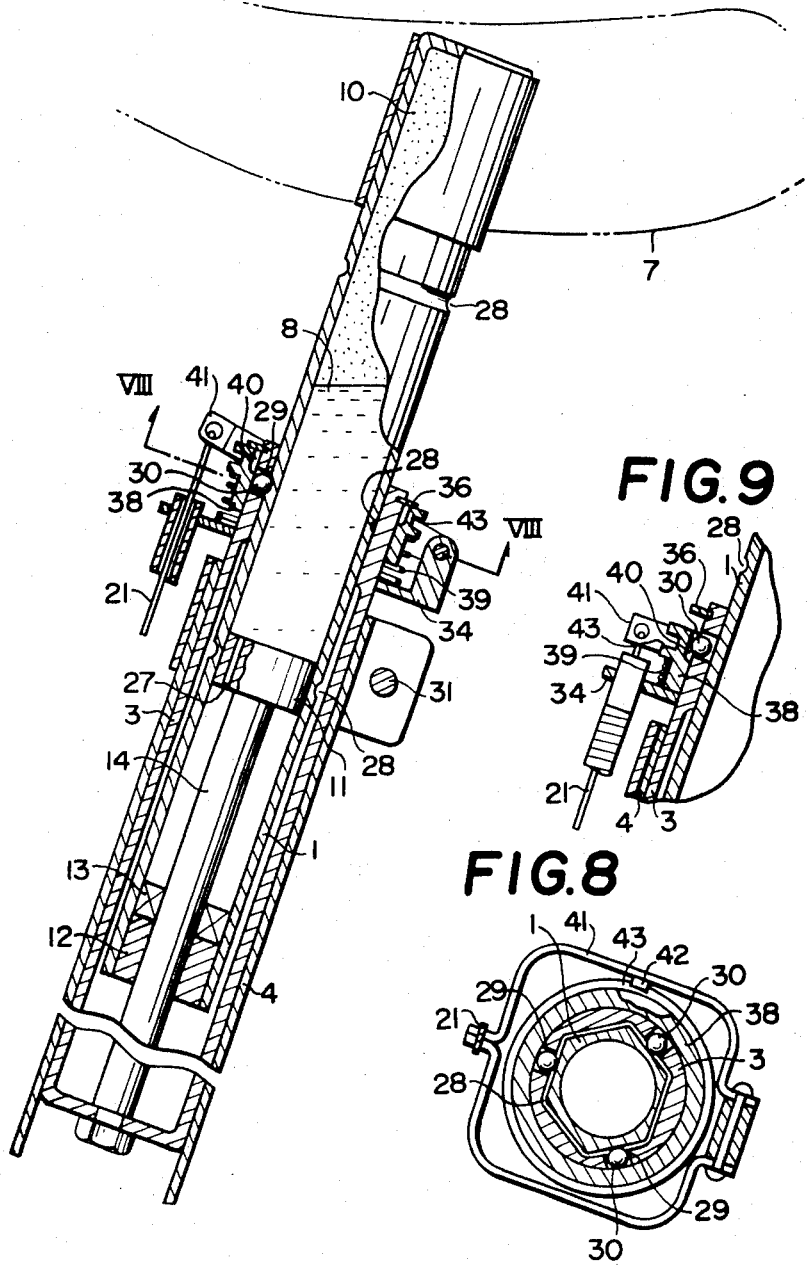

SADDLE POSITION ADJUSTING DEVICE FOR A VEHICLE SUCH AS BICYCLE

This invention relates to a device for adjusting the height of a saddle for a manually driven vehicle such as a bicycle, tricycle or a four-wheel vehicle. The device is operable for adjusting the height of the saddle when a rider is mounted or not mounted on the saddle. A vehicle such as a bicycle may be driven more easily if the saddle can be lowered sufficiently when the rider mounts and dismounts the vehicle. However, once the vehicle starts running, the saddle should be raised to a desired level so that the rider can apply a sufficiently large force on the pedals in the most comfortable position to minimize fatigue. This is especially advantageous for long riding. When stopping at crossroads, the rider on the bicycle will be able to hold himself in a stabilized position if the saddle can be lowered until his feet reach the ground.

The primary purpose of this invention is to provide a device with which the rider can adjust the height of the saddle while mounted thereon.

Another purpose of this invention is to provide a device for adjusting the height of the saddle easily.

Still another purpose of this invention is to provide a device for elevating and lowering the saddle at a moderate but not too rapid speed to avoid any shock being transmitted to the rider.

Still further purpose of this invention is to provide a saddle position adjusting device which can lock the saddle in the reliable manner that it is not released even when a shock is applied on the saddle from the rider.

These and other purposes of this invention will be understood when the following description is read with reference to the accompanying drawings, wherein FIG. 1 is an elevational view of a portion of a bicycle equipped with a saddle position adjusting device according to one embodiment of this invention;

FIG. 4 is a vertical section of the saddle mounting portion according to another embodiment of this invention;

FIG. 5 is a section taken along line V—V of FIG. 4;

FIG. 6 is a portion of FIG. 4, shown in the state when the saddle is unlocked;

FIG. 7 is a similar view to FIG. 4, showing the vertical section of the saddle mounting portion according to still another embodiment of this invention;

FIG. 8 is a section taken along line VIII—VIII of FIG. 7; and

FIG. 9 is a portion of FIG. 7, shown in the state when the saddle is unlocked.

Figure 1:
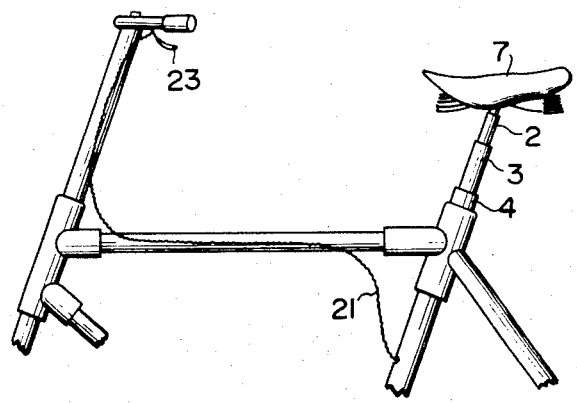
Figure 2:
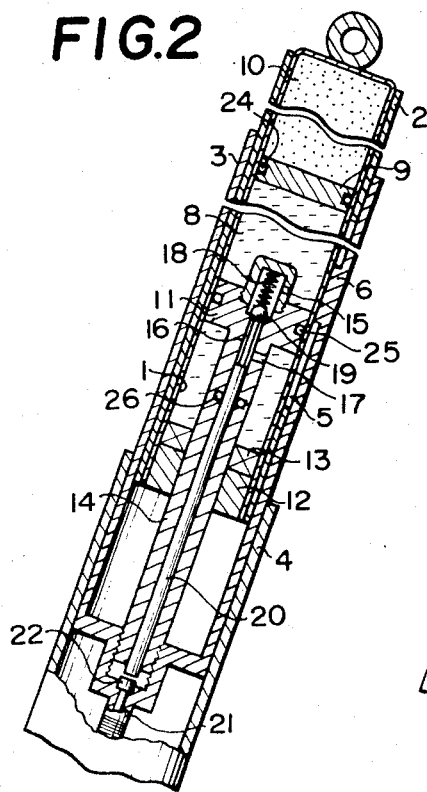
FIG. 2 is a vertical section of the saddle mounting portion of FIG. 1.
Figure 3:
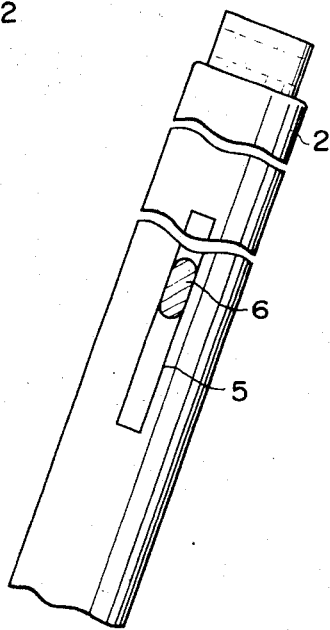
FIG. 3 is a front elevation of the saddle mounting portion of FIG. 2.

First refer to FIG. 2, wherein a pipe 2 fitted securely around an oil cylinder 1 is slidably inserted in a cylindrical body 3, which in turn is fixed in the upper portion of the frame pipe 4 of a vehicle such as bicycle. The pipe 2 has an elongate axial slot 5 formed in it to receive a projection 6 formed on the inner wall surface of the cylindrical body 3, so that the oil cylinder 1 is slidable in the axial direction but not rotatable with respect to the frame pipe 4. The oil cylinder 1 carries a saddle 7 on its top end. The bore of the oil cylinder 1 in which a free piston 9 is placed, is filled with an oil 8. The oil cylinder 1 also contains a high-pressure gas 10 hermetically sealed above the free piston 9. A piston 11 is inserted in the oil cylinder 1; the piston rod 14 extends out of the oil cylinder 1 after passing through a rod guid 12 and oil seal 13 located within the lower portion of the oil cylinder 1. The lower end of the piston rod 14 is fixed to the cylindrical body 3 and the piston 11 has a series of narrow oil paths 15, 16 and 17 for communicating the spaces above and below the piston 11. A ball valve 19 is arranged so that it is normally pressed against the inlet of the oil path 16. A slidable rod 20 is inserted in the piston rod 14 in such a manner that the upper end of the rod 20 is in opposition to the ball valve 19 and the lower end of the rod 20 is in opposition to the top end of a flexible shaft 21. The other end of the flexible shaft 21 is connected to a lever 23 which can be mounted at any convenient position such as on the handle of a bicycle. When the lever 23 is operated, the top end 22 of the flexible shaft 21 will move upward (FIG. 2) to push up the slidable rod 20. To prevent leakage of oil 8, the free piston 9, piston 11 and slidable rod 20 each carry an O-ring, 24, 25 and 26, respectively.

According to the above-described device, the ball valve 19 normally closes the oil path 16 so that the communication of the oil 8 through the piston 11 is shut off and the piston 11 is kept locked with respect to the cylinder 1. Thus the saddle 7 is locked at a constant position.

When the lever 23 is operated, the slidable rod 20 is pushed up by the top end 22 of the flexible shaft 21 to be moved upward seen in FIG. 2. At this time the slidable rod 20 will push up with its top end the ball valve 19 to open the oil path 16, so that the spaces above and below the piston 11 are communicated with each other through the oil paths 15, 16 and 17. When rider's bodyweight is not applied on the saddle 7, the oil cylinder 1 and, hence, the saddle 7 will move upward (seen in FIG. 2) by the pressure of the high-pressure gas 10. At this time when the lever 23 is released, the saddle 7 will be locked at the position.

On the other hand, when the rider operates the lever 23 while sitting on the saddle 7, the high-pressure gas 10 will be compressed by the load of his body-weight, so that the oil cylinder 1 and, hence, the saddle 7 will be lowered over a corresponding distance. The foregoing operation proceeds at a moderate speed because of a large resistance of the oil 8 passing through the narrow oil paths 15, 16 and 17.

When stopping the bicycle if the lever 23 is operated, the saddle 7 will be lowered by the load of rider's body-weight until the rider can reach his feet to the ground. This facilitates the rider to dismount the bicycle.

To ride on the bicycle again, the rider can mount on the bicycle of which saddle 7 is now in the lower position. After starting, while supporting his body on the pedals to float his hips above the saddle 7, the rider can operate the lever 23 to elevate the saddle 7 until it reaches the most suitable level. At this time if the lever 23 is released, the oil cylinder 1 is locked. In this way the rider can drive the bicycle in the most comfortable position.

According to another embodiment of this invention shown in FIG. 4-6, the oil cylinder 1 includes no free piston but the high pressure gas 10 is charged in the oil cylinder 1 directly on and above the oil 8. The first embodiment of this invention involves a danger that the oil cylinder 1 may be unlocked when a vacuum space is formed under the piston 11 upon application of an excessively large load on the saddle 7. The present embodiment avoids this danger.

According to this embodiment, a narrow oil path 27 formed through the piston 11 includes no valve. The oil cylinder 1 is designed in such a manner that it is locked by a plurality of steel balls 30 which are received in the holes 29 formed in the wall of the cylindrical body 3 and cooperate with a plurality of annular grooves 28 formed in the outer surface of the oil cylinder 1. The cylindrical body 3 is fixed to the frame pipe 4 with a bolt 31. The oil cylinder 1 is formed so that it has a hexagonal section to prevent its rotation with respect to the cylindrical body 3. A rotatable ring 33 has a plurality of recesses 32 in its inner wall surface and is rotatably mounted around the upper portion of the cylindrical body 3 so that the inner surface of the rotatable ring 33 prevents the steel balls 3 from slipping out of the recesses 32. The steel balls 30 are pressed by the inner wall surface of the rotatable ring 33 into one of the annular grooves 28 in the oil cylinder 1 to prevent the axial movement of the oil cylinder 1. A coil spring 35 is loaded between a collar 34 fixed on the cylindrical body 3 and the rotatable ring 33 for biasing the rotatable ring 33 in the circumferential direction. Snap rings 36 and 27 serve to prevent the axial movement of the rotatable ring 33 and connect the forward end of the flexible shaft 21 to the rotatable ring 33.

When the flexible shaft 21 is pulled, the rotatable ring 33 rotates against the elasticity of the coil spring 35 until the recesses 32 are in opposition to the respective steel balls 30. At this time the steel balls 30 slip out of the annular groove 28 in the oil cylinder 1 so that the oil cylinder 1 can be moved axially. When the flexible shaft 21 is loosened and the steel balls 30 project into one of the annular grooves 28, the rotatable ring 33 rotates by the action of the spring 35 to prevent the steel balls 30 from slipping out of the annular groove 28, so that the oil cylinder 1 is locked at this position.

The embodiment shown in FIGS. 7–9 has a structure almost similar to the embodiment which has been described with reference to FIGS. 4–6. A slidable ring 38 is mounted around the upper portion of the cylindrical body 3 so that it slides in the axial direction to lock and release the oil cylinder 1 and is normally pressed against the snap ring 36 by a spring 39. The slidable ring 38 has an annular groove 40 formed in its inner wall surface at a suitable position. A looped lever 41 is supported at its one end by the collar 34 and connected at its other end to the forward end of the flexible shaft 21. A projection 42 formed on the lever 41 at its center position is projected into an annular groove 43 formed in the outer surface of the slidable ring 38. The steel balls 30 are normally pressed by the inner wall surface of the slidable ring 38 so that they engage with one of the annular grooves 28 in the oil cylinder 1 to prevent the axial movement of the oil cylinder 1. When the flexible shaft 21 is pulled, the slidable ring 38 moves against the action of the spring 39 in the axial direction so that the annular groove is brought into opposition to the steel balls 30. At this time the steel balls 30 slip out of the annular groove 28 formed in the oil cylinder 1, allowing the movement of the oil cylinder 1. When the flexible shaft 21 is loosened, the slidable ring 38 returns to the original position by the action of the spring 39. When the steel balls 30 engage with one of the annular grooves 28, the oil cylinder 1 is locked.

What is claimed is:

1. A saddle position adjusting device for a vehicle, comprising an oil cylinder carrying a saddle at one end and having oil and gas under high-pressure contained therein, the oil cylinder being mounted in frame means of said vehicle by means whereby said cylinder is slidable in the axial direction but not rotatable with respect to said frame means; means including a piston arranged in said cylinder for communicating the oil between the spaces above and below said piston; means for locking the oil cylinder at a desired position, said locking means including a piston rod of which the lower end is fixed to the frame means; and means for releasing the lock of the oil cylinder, said releasing means being constructed and arranged to permit operation by a rider while on said vehicle.

2. A saddle position adjusting device according to claim 1, wherein said locking means is a valve which normally closes the oil communicating means by the action of a spring; and said releasing means is a slidable rod which is slidably inserted in the piston rod whereby the top end thereof is in opposition to the valve.

3. A saddle position adjusting device according to claim 2, wherein the frame means is fixed around the oil cylinder; a cylindrical body is slidably mounted in the upper portion of the frame means; a projection formed on the inner wall surface of said cylindrical body projects into an axial groove formed in the frame means whereby the oil cylinder is axially slidable but not rotatable with respect to the frame means.

4. A saddle position adjusting device according to claim 2, wherein a free piston is arranged in the upper portion of the oil cylinder to separate the high-pressure gas from the oil.

5. A saddle position adjusting device according to claim 1, wherein said locking means includes a plurality of annular grooves formed in the outer wall surface of the oil cylinder and a plurality of steel balls arranged whereby said balls engage said annular grooves and recesses formed in the inner wall surface of the cylindrical body which is mounted in the upper portion of the frame means; and said releasing means is a rotatable ring having in its inner wall surface a plurality of recesses for receiving steel balls, the rotatable ring being rotatably mounted around the cylindrical body and biased in the circumferential direction by the action of a spring.

6. A saddle position adjusting device according to claim 5, wherein the oil cylinder is formed whereby its outer surface has a polygonal cross-section and the cylindrical body is formed in such a manner that its inner surface has a polygonal cross section corresponding to the outer surface of the oil cylinder, whereby the oil cylinder is not rotatable with respect to the cylindrical body.

7. A saddle position adjusting device according to claim 5, wherein the frame means is fixed to the cylindrical body with a bolt arranged outside the frame pipe at its upper end.

8. A saddle position adjusting device according to claim 5, wherein the rotatable ring is moved axially by two snap rings arranged around the upper portion of the cylindrical body.

9. A saddle position adjusting device according to claim 1, wherein said locking means includes a plurality of annular grooves formed in the outer wall surface of the oil cylinder and a plurality of steel balls arranged whereby said balls engage said annular grooves and recesses formed in the inner wall surface of the cylindrical body mounted in the upper portion of the frame means; and said releasing means is a rotatable ring having in its inner wall surface annular grooves for receiving steel balls, the rotatable ring being mounted around the cylindrical body whereby said cylinder is slidable in the axial direction and biased in the axial direction by the action of a spring.

10. A saddle position adjusting device according to claim 9, wherein an annular groove is formed in the outer wall surface of the slidable ring; and a projection for engagement with the annular groove is formed on a looped lever at its center position, the looped lever being pivoted at its one end.

* * * * *